United States Patent [19]
Kibourian

[11] Patent Number: 5,168,860
[45] Date of Patent: Dec. 8, 1992

[54] BARBEQUE

[76] Inventor: Gabriel Kibourian, 2835 Islington Ave., #502, Weston, Ontario, Canada, M9L 2K2

[21] Appl. No.: 711,683

[22] Filed: Jun. 7, 1991

[51] Int. Cl.⁵ .............................................. F24B 3/00
[52] U.S. Cl. .................................. 126/25 R; 126/26; 126/41 R; 126/15 A
[58] Field of Search ................ 126/25 R, 29, 26, 38, 126/41 R, 41 D, 41 E, 15 R, 15 A

[56] References Cited

U.S. PATENT DOCUMENTS

| | | |
|---|---|---|
| 3,159,119 | 12/1964 | Hottenroth et al. ............ 126/25 R |
| 3,266,478 | 8/1966 | Booth . |
| 3,286,620 | 11/1966 | Brown . |
| 3,324,788 | 6/1967 | La France . |
| 3,326,201 | 6/1967 | Murray . |
| 3,327,697 | 6/1967 | Berlant ............................. 126/25 R |
| 3,442,201 | 5/1969 | Kates . |
| 3,442,202 | 5/1969 | Ishida . |
| 3,693,534 | 9/1972 | Martin . |
| 3,931,805 | 1/1976 | Nelson .......................... 126/25 R X |
| 3,982,522 | 9/1976 | Hottenroth et al. ......... 126/25 R X |
| 4,593,676 | 6/1986 | Wackerman ...................... 126/41 R |
| 4,616,624 | 10/1986 | Parker .......................... 126/25 R X |
| 4,635,613 | 1/1987 | Tucker et al. ................. 126/41 R X |
| 4,867,050 | 9/1989 | Patenaude et al. ........... 126/15 A X |
| 4,884,554 | 12/1989 | Yanagida ..................... 126/25 R X |

*Primary Examiner*—Larry Jones
*Attorney, Agent, or Firm*—Bereskin & Parr

[57] ABSTRACT

A barbeque has a base and a hollow column extending upwardly from the base to an upper housing, which may comprise a housing body an a lid. A firebox is provided within the housing for charcoal or other fuel and is perforated to permit combustion air to pass therethrough. A fan is provided at a lower end of the column, for drawing air up through the column and forcing it through into the upper body and hence through the firebox, for promoting combustion of the fuel.

12 Claims, 2 Drawing Sheets

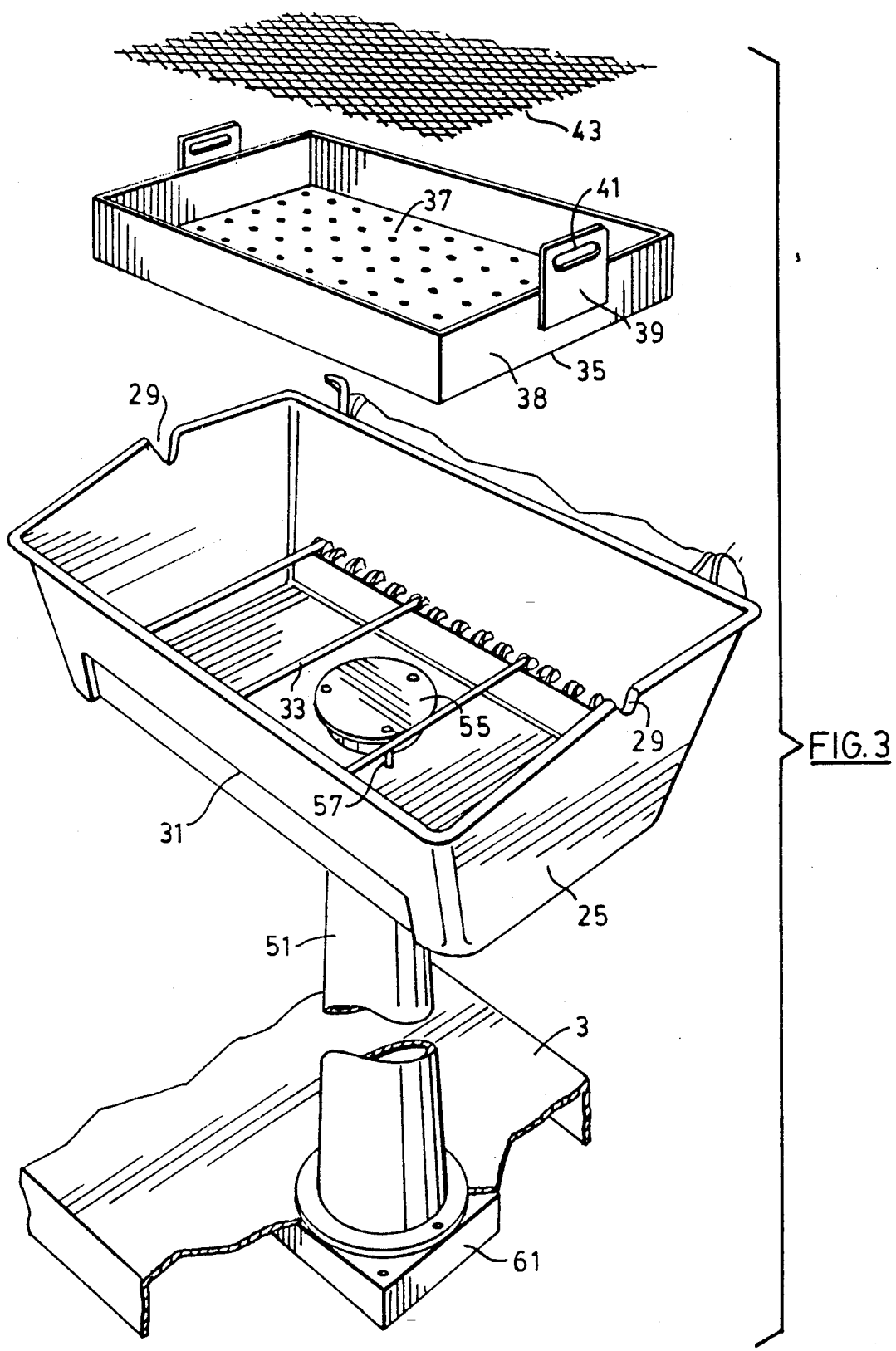

BARBEQUE

FIELD OF THE INVENTION

This invention relates to a barbeque, and more particularly relates to a charcoal-fired barbeque provided with a fan for enhancing the air flow over the charcoal.

BACKGROUND OF THE INVENTION

There are a wide variety of known barbeque designs, some of which relate to charcoal-fired barbeques, and others of which relate to gas-fired barbeques.

U.S. Pat. No. 3,159,119 (Hottenroth et al) discloses a charcoal starter and cooker. As such, it provides a separate container for charcoal and a fan for providing a forced draft, to promote rapid ignition of the charcoal. It is suggested that the device could be used as a cooker, for example, for coffee pots and frying pans, by placing some of the charcoal in the base of the unit and covering it with a mesh. Nonetheless, in either mode, it does not provide a full conventional barbeque, and suffers from the disadvantage that the fan is located very close to the charcoal itself. It would be quite possible for the heat from the charcoal to damage the fan, particularly if the device was not emptied promptly, once the charcoal was fully lit.

U.S. Pat. No. 3,326,201 (Murray) discloses a barbeque apparatus incorporating a fan for providing a forced draft. A somewhat complex arrangement is provided, including a pair of valves, one of which is intended to control the overall air flow, and the other which determines whether the air flows through or over the bed of charcoal. The fan itself is mounted immediately beside the fire bed and again, could be prone to damage through overheating.

U.S Pat. No. 3,327,697 (Berlant) discloses a cooking device provided with a so-called air curtain. Here, a fan is mounted immediately below the barbeque and blows air through inner and outer casings of housings, to create a forced air curtain rising up around the edges of the barbeque. It also provides a forced draft effect for the charcoal itself. The fan again is mounted immediately against the barbeque, underneath it, in an exposed position.

The barbeque apparatus disclosed in U.S. Pat. No. 3,266,478 (Booth), again, is relatively complex. A fax is provided for providing combustion air, and there are numerous individual baskets for the fuel.

A somewhat unusual electric cooker with a heated rock bed is disclosed in U.S. Pat. No. 3,286,620 (Brown). This is primarily intended to provide a cooker suitable for Polynesian cooking, and as such provides a substantial bed of rocks that could be heated, and then enclose the food for a slow cooking process. The whole apparatus is of some bulk and is carried on a small trailer suitable for towing by a vehicle.

U.S. Pat. Nos. 3,442,201 (Kates) and 3,442,202 (Ishida) disclose barbeque grills provided with rotisserie arrangements.

U.S. Pat. Nos. 3,324,788 (La France) and 3,693,534 (Martin) both disclose barbeques with devices for improving or altering the draft characteristics. The first patent is concerned with a charcoal-type barbeque, whereas the later one is concerned with a gas barbeque.

SUMMARY OF THE PRESENT INVENTION

Despite the variety of earlier proposals in this field, there is no existing design which is simple and robust, and which can provide a forced draft for charcoal, to ensure rapid ignition of the charcoal. It is desirable that such a design should utilize conventional barbeque components to the largest extent possible, and should have the fan mounted in a manner that protects the fan from the fire itself. It is also desirable that the fan should be capable of variable speed operation, to enable a variable draft to be provided.

In accordance with the present invention, there is provided a barbeque comprising a base, a hollow column extending upwardly from the base, an upper housing mounted on top of the column, and including a lower opening surrounded by the column, a firebox within the upper housing for containing combustible fuel and being perforated, to permit combustion air to pass therethrough, and a fan located adjacent the lower end of the column, for forcing air up through the column and into the upper housing.

BRIEF DESCRIPTION OF THE DRAWINGS

For better understanding of the present invention and to show more clearly how it may be carried into effect, reference will now be made, by way of example, to the accompanying drawings, which show a preferred embodiment of the present invention, and in which:

FIG. 3 is a perspective exploded view of elements of the barbeque of FIGS. 1 and 2.

DESCRIPTION OF THE PREFERRED EMBODIMENT

Figure 2:
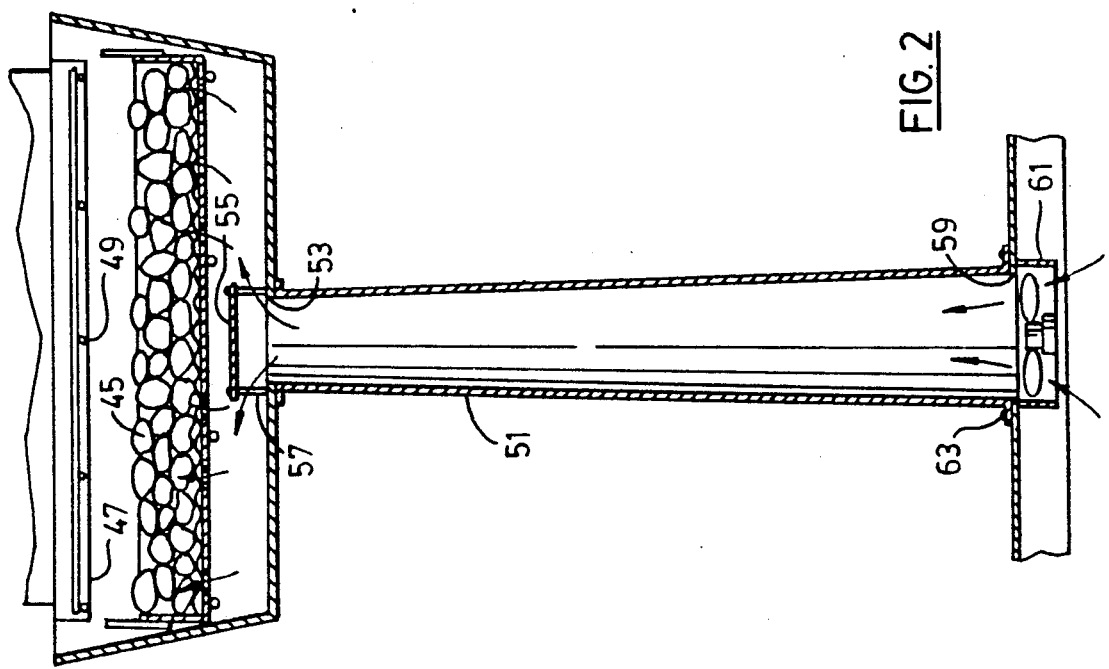
FIG. 2 is a vertical sectional view of part of the barbeque of FIG. 1.
Figure 1:
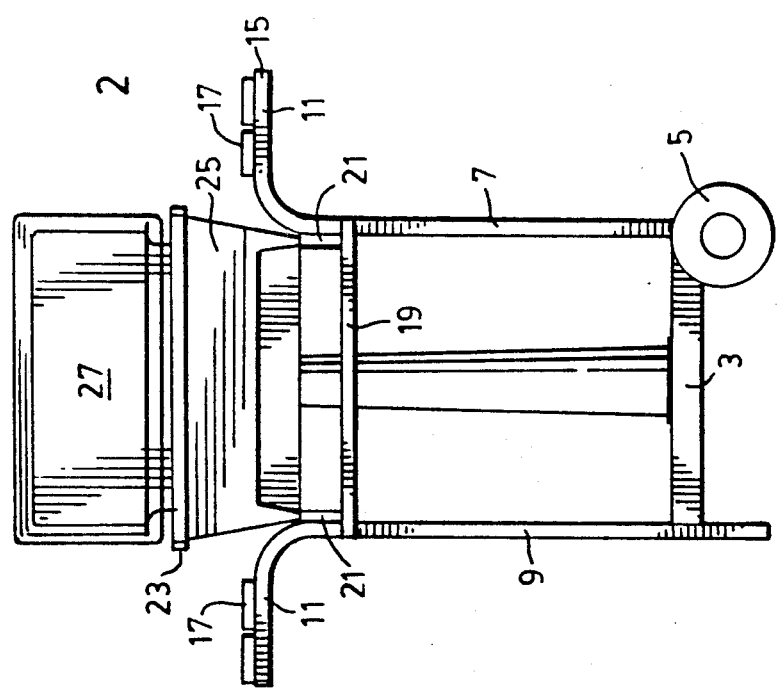
FIG. 1 is a front view of a barbeque in accordance with the present invention.

The barbeque as a whole is designated by the reference 1. The barbeque 1 includes a base 3, which could be formed from sheet steel in known manner with downwardly turned side edges. At one end of the base 3, there is a pair of wheels 5 mounted on a transverse axle in known manner.

Extending out from the base 3 are a pair of right hand side support legs 7 and a pair of left hand side support legs 9. The legs 9 continue down to provide a ground support at the left hand side. As shown at 11, each support leg 7, 9 continues into a horizontal portion extending out from the center of the barbeque 1. The legs 7, 9 are separate from one another. However, for each pair of legs 7, 9 the ends of the horizontal portions 11 could be joined by a transverse portion (not shown). Wooden strips 17 are secured to the horizontal portions 11, to form small support or working surfaces, on which a user can place cooking utensils, bottles, pans, etc. Front and rear cross members 19 join the legs 7, 9 together.

Although not shown, if desired, a further support or working surface can be provided in front of the barbeque 1, in known manner.

Sheet metal side cross members 21 join each pair of legs 7, 9 together, and form a support for an upper housing 23. Thus, the housing 23 and support surfaces in known manner are located at a convenient working height, generally waist height.

The upper housing 23 includes a housing body 25 and a lid 27, both of which would be formed from cast aluminum or the like. The housing body 25 is secured by screws and the like in known manner to the side cross members 21. The lid 27 is pivotally attached along a rear edge of the housing body 25. In known manner, the housing body 25 includes notches 29 for supporting a rotisserie device.

The front and rear of the housing body 25 are shaped to form internal ledges, as evidenced by the external profile at 31.

A support frame 33 is located on the internal ledges. The frame 33 comprises two front and rear bars and four transverse bars.

A firebox 35 is generally rectangular, and is formed from sheet steel. The firebox 35 includes a base 37 provided with a plurality of small apertures, and a flange 38 extending upwardly around the base 37. It includes at either end small rectangular panels 39 including handle apertures 41.

A wire mesh 43 is provided having a profile conforming to the interior of the firebox 35.

As shown in the section of FIG. 2, in use the firebox 35 is located on the support frame 33. The wire mesh 43 sits at the bottom of the firebox 35, and a desired quantity of charcoal, indicated at 45, is placed in the firebox 35.

In known manner, the housing body 25 defines, again at the front and rear, an upper ledge 47 on which are located one or more grids 49 for supporting food items.

In accordance with the present invention, a hollow tubular column 51 extends between the base 3 and housing body 25. The column 51 includes outwardly directed flanges at either end and tapers slightly in a upward direction.

The housing body 25 includes a central opening 53, which is covered by a protective cover plate 55. Screws 57 and appropriate washers and nuts, etc., support the cover plate 55 at a location spaced above the opening 53. The same or different screws are also used to secure the upper flange of the column 51 to the housing body 25.

Although not shown, the housing body 25 could be formed with an upwardly directed flange around the opening 53 and covered by the cover plate 55, to prevent ash, debris, etc., coming from the firebox 35 from falling down the column 51.

The base 3 has a corresponding opening, and below this opening a fan 61 is provided. Screws 63 secure the column 51 to the base 3. Again, the same or different screws can also be used to secure the fan 61 to the base 3. The fan body 61 could include a suitable mounting flange and forms an extension of the hollow column 51.

The fan 61 could be any suitable fan. It is preferred for the fan 61 to be a low voltage DC fan, which could be supplied from a conventional 120 volt AC supply via a suitable transformer and rectifier unit, which are readily available. By providing a low voltage fan, in most jurisdictions there is no necessity to obtain regulatory approval for use of the appliance outside. However, for some uses, for example for larger, commercial barbeques, it may be preferable to provide a larger 120 volt AC fan, if only because this eliminates the requirement for any transformer and rectifier.

Further, although not shown, the fan 61 is preferably provided with a control device providing infinitely variable control of the power supply, so as to enable the output of the fan 61 to be controlled as desired. This is conveniently provided on the side of the column. Alternatively, for a simpler barbeque, a simple on/off switch for the fan 61 can be provided. This could be a push button switch located on the base 3 for foot operation.

In use of the barbeque, the firebox 35 would be located as shown, and filled with charcoal 45 as indicated. The charcoal 45 could be lit in known manner, for example, by use of known lighting fluids. In view of the efficiency provided by the fan 61, only a small quantity of such fluid should be required.

The fan 61 can be then turned on and the lid 27 closed, to permit the combustion to spread throughout the entire bed of charcoal 45. It has been found that the provision of the fan 61 greatly accelerates this process, and in a relatively short time, the entire bed of charcoal 65 should be ready for cooking.

The arrangement of the holes in the firebox base 37 and the wire mesh 43 ensure an even distribution of the air flow over the charcoal 45, so that combustion is uniform throughout the charcoal bed.

Food items can then be placed on the grid 49 for cooking. For higher temperatures, the fan 61 could be left on, or for a lower cooking temperature it can be turned off. Alternatively, where variable speed control is provided for the fan 61, this can be adjusted to provide for a desired temperature.

It will be appreciated that food on the grid 49 is heated and hence cooked both by radiant heat from the charcoal bed 45, and also by convective heating from the hot air flowing up from the bed 45. The fan 61 should be adjusted so that the combination of these two cooks the food at the desired rate. Further, in known manner, the lid 27 can be left open or closed, or even propped in a partially open position.

Whilst the described embodiment includes support legs 7, 9 as well as the column 51, it will be appreciated that the design could be simplified by the omission of the legs 7, 9. Thus, a suitably robust and strong column 51 could be provided which acts as a support for the upper housing 23. In this case, if it is desired to provide the working surfaces formed from the wooden strips 17, appropriate support members could extend directly out from underneath the housing body 25.

I claim:

1. A barbeque for burning solid fuel and comprising a base, a hollow column extending upwardly from the base, an upper housing mounted on top of the column and including a lower opening surrounded by the column, a firebox within the upper housing for containing combustible solid fuel and being perforated, to permit combustion air to pass therethrough, and a fan mounted within the column and spaced from the upper housing toward the lower end of the column, for forcing air up through the column and into the upper housing, which includes a protective cover member within the upper housing which covers the opening in the upper housing, and which is mounted above and spaced from that lower opening.

2. A barbeque as claimed in claim 1, wherein the base includes an opening surrounded by the hollow column, whereby air is drawn up from below the base, and through the column into the upper housing.

3. A barbeque as claimed in claim 2, wherein the fan is mounted within the base in an extension of the hollow column.

4. A barbeque as claimed in claim 2 or 3, wherein the upper housing includes a lip around the lower opening to prevent ash or other particulate material falling down within the hollow column.

5. A barbeque as claimed in claim 3, wherein the firebox comprises a generally rectangular base and a flange extending upwardly around the edge of the base, and wherein the base of the firebox includes a plurality of holes which are uniformly spaced and which permit combustion air to pass therethrough.

6. A barbeque as claimed in claim 5 which includes a wire mesh within the firebox, for spacing fuel from the base thereof, to promote even distribution of combustion air.

7. A barbeque as claimed in claim 6 wherein the upper housing comprises a housing body and a lid attached to the housing body by a hinge.

8. A barbeque as claimed in claim 7, wherein the upper body includes a lip around the lower opening therein, to prevent ash from falling down into the hollow column.

9. A barbeque as claimed in claim 1, which includes a lip around the lower opening, to prevent ash or other particulate material from falling down the column.

10. A barbeque as claimed in claim 9, wherein the firebox comprises a generally rectangular base and a flange extending upwardly around the edge of the base, the base of the firebox includes a plurality of holes which are uniformly spaced and which permit combustion air to pass therethrough, and a wire mesh located within the firebox, for spacing solid fuel from the base thereof, to promote even distribution of combustion air.

11. A barbeque as claimed in claim 1, 10, or 8, which includes wheels at one end of the base and support legs at the other end of the base.

12. A barbeque as claimed in claim 1, 10, or 8, which includes a pair of legs at either side thereof, extending upwardly from the base to the upper body, with the legs at one side extending down to the ground, and with a pair of wheels being provided at the other side of the base.

* * * * *